United States Patent
Yamaguchi (10) Patent No.: US 9,302,450 B2
(45) Date of Patent: Apr. 5, 2016

(54) OPTICAL ELEMENT, OPTICAL SYSTEM, AND OPTICAL APPARATUS

(71) Applicant: CANON KABUSHIKI KAISHA, Tokyo (JP)

(72) Inventor: Yutaka Yamaguchi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/527,833

(22) Filed: Oct. 30, 2014

(65) Prior Publication Data

US 2015/0132554 A1    May 14, 2015

(30) Foreign Application Priority Data

Nov. 13, 2013    (JP) ................................. 2013-234892

(51) Int. Cl.
*B32B 15/04*    (2006.01)
*B32B 7/02*    (2006.01)
*G02B 27/00*    (2006.01)

(52) U.S. Cl.
CPC . *B32B 15/04* (2013.01); *B32B 7/02* (2013.01); *G02B 27/00* (2013.01); *B32B 2307/418* (2013.01); *B32B 2551/00* (2013.01); *Y10T 428/2495* (2015.01); *Y10T 428/24942* (2015.01)

(58) Field of Classification Search
CPC ...... B32B 15/04; B32B 7/02; B32B 2551/00; B32B 2307/418
See application file for complete search history.

(56) References Cited

U.S. PATENT DOCUMENTS

| | | | | |
|---|---|---|---|---|
| 2012/0009382 | A1* | 1/2012 | Kishimoto | B29C 67/08 428/119 |
| 2013/0084442 | A1* | 4/2013 | Akutagawa | C09D 127/20 428/212 |
| 2013/0308192 | A1* | 11/2013 | Shimoda | G02B 1/113 359/581 |
| 2014/0313584 | A1* | 10/2014 | Hanada | G02B 27/4205 359/571 |

FOREIGN PATENT DOCUMENTS

JP    2012-141594 A    7/2012

OTHER PUBLICATIONS

Lee, "Optical Thin Film and Film Formation Technologies" AGNE Gijutsu Center, 2008, pp. 14, 36-41, 249.

* cited by examiner

*Primary Examiner* — Tahseen N Khan
(74) *Attorney, Agent, or Firm* — Rossi, Kimms & McDowell LLP (57) ABSTRACT

An optical element includes an antireflection film. The antireflection film includes an uppermost layer having a refractive index nd of 1.20 to 1.30, a high refractive index layer having a refractive index of 2.00 to 2.40, and at least one of an intermediate refractive index layer having a refractive index of 1.55 to 1.70 and a low refractive index layer having a refractive index of 1.40 to 1.52. The predetermined condition is satisfied.

18 Claims, 10 Drawing Sheets

OPTICAL ELEMENT, OPTICAL SYSTEM, AND OPTICAL APPARATUS

BACKGROUND OF THE INVENTION

1. Field of the Invention

The present invention relates to relates to an optical element, an optical system, and an optical apparatus, each of which has an antireflection film (or coating).

2. Description of the Related Art

Conventionally, there are known a multiplayer antireflection film that includes a plurality of thin dielectric films laminated on a surface of a transparent material by a vapor deposition, and a lower-reflection antireflection film that includes a nanostructure film or porous film formed on an evaporated undercoat layer by a method, such as the oblique deposition and spin-coat process. For example, Japanese Patent Laid-Open No. 2012-141594 proposes an antireflection film that includes seven to eleven laminated layers.

Cheng-Chung Lee, "Optical Thin Film and Film Formation Technologies" AGNE Gijutsu Center, 2008, pp 14, 36-41, 249 describes the optical admittance.

Stray light reflected on a lens surface in an optical system may have an incident angle of 60° or higher. In general, the surface reflectance at a high incident angle tends to be very high, and an antireflection film optimal to the high incident angle has a remarkably low antireflection performance to image-pickup light near the normal incidence.

SUMMARY OF THE INVENTION

The present invention provides an optical element, optical system, and optical apparatus each of which has an antireflection film and can maintain a high antireflection performance in a wide input angle range.

An optical element according to the present invention includes a substrate that is transparent to a d-line, and an antireflection film formed on the substrate. The antireflection film includes a plurality of thin film layers that include an uppermost layer that is most distant from the substrate and has a refractive index nd of 1.20 to 1.30 to the d-line, a high refractive index layer having a refractive index of 2.00 to 2.40 to the d-line, and at least one of an intermediate refractive index layer having a refractive index of 1.55 to 1.70 to the d-line and a low refractive index layer having a refractive index of 1.40 to 1.52 to the d-line. When an undercoat layer includes the substrate to the thin film layer adjacent to the uppermost layer, and the following expression is satisfied where $Y(\theta, \lambda)$ is an optical admittance calculated from a refractive index to the d-line and a film thickness of the undercoat layer, $\theta$ is an incident angle in a range of 0° to 60°, and $\lambda$ is a wavelength in a range of 420 nm and 680 nm:

$$nd - 0.1 \le \sqrt{Y(\theta, \lambda)} \le nd.$$

Further features of the present invention will become apparent from the following description of exemplary embodiments with reference to the attached drawings.

DESCRIPTION OF THE EMBODIMENTS

Figure 1:
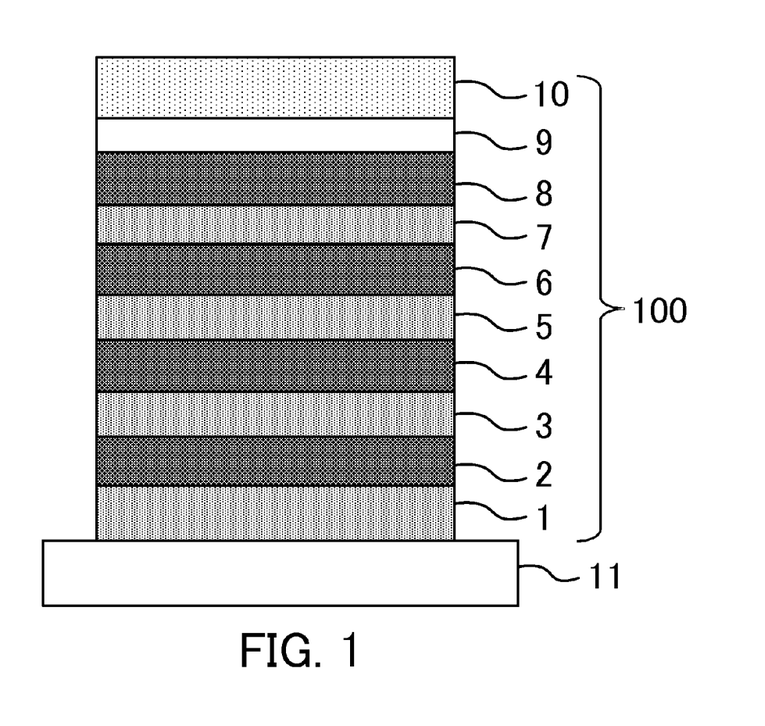
FIG. 1 is a schematic sectional view of an optical element according to this embodiment.

FIG. 1 is a schematic sectional view of an optical element according to this embodiment. The antireflection film 100 includes ten thin film layers 1 to 10 formed on a substrate 11 that is transparent to the d-line. The thin film layers 1, 2, 3, 4, 5, 6, 7, 8, 9, and 10 are referred to as a first layer, a second layer, a third layer, a fourth layer, a fifth layer, a sixth layer, a seventh layer, an eighth layer, a ninth layer, and a tenth layer from the substrate side, respectively.

The thin film layers 1, 3, 5, and 7 are intermediate refractive index layers each having a refractive index of 1.55 to 1.70, the thin film layers 2, 4, 6, and 8 are high refractive index layers each having a refractive index of 2.00 to 2.40, and the thin film layer 9 is a low refractive index layer having a reflective index of 1.40 to 1.52. The thin film layer 10 has a refractive index of 1.20 to 1.30 that is lower than that of the thin film layer 9. The refractive index in this embodiment is defined as a refractive index to the d-line. Thus, a plurality of thin film layers has at least one of the intermediate refractive index layer and a low refractive index layer. The low refractive index layer may have a refractive index of 1.40 to 1.52 to the d-line.

Thus, the thin film layers 1 to 9 in the antireflection layer 100, located between the substrate 11 and the thin film layer 10 that is the uppermost layer most distant from the substrate 11, include at least one of the high refractive index layer and the intermediate refractive index layer. The intermediate refractive layer has a refractive index higher than that of the low refractive index layer, and the high refractive index layer has a refractive index higher than that of the intermediate refractive index layer. As in this embodiment, the low refractive index layer having a refractive index of 1.40 to 1.52 may be provided between the uppermost layer and the high refractive index layer closest to the uppermost layer, but this configuration is not essential.

The antireflection film 100 maintains a low reflectance over an incident angle range of 0° to 60° in a visible wavelength range. The following conditional expression is satisfied, where nd is a refractive index of the thin film layer 10, $\theta$ is an arbitrary incident angle in the incident angle range of 0° to 60°, $\lambda$ is an arbitrary wavelength between 420 nm and 680 nm, and $Y(\theta, \lambda)$ is an optical admittance of an undercoat layer from the substrate 11 to the thin film layer 9 adjacent to the uppermost layer which is calculated from the refractive index and the film thickness of the undercoat layer:

$$nd - 0.1 \leq \sqrt{Y(\theta, \lambda)} \leq nd \quad (1)$$

When the conditional expression (1) is satisfied with the arbitrary incident angle θ and each wavelength λ, an antireflection film has a low reflection in a wide incident angle range.

According to Cheng-Chung Lee, "Optical Thin Film and Film Formation Technologies," supra, the optical admittance is a ratio between the electric field and the magnetic field strength in the medium, and is an amount equivalently treated as a refractive index in a medium when $Y0 = \sqrt{\in 0 / \mu 0}$ as a value in vacuum is set to a unit. In addition, by using the optical admittance and the characteristic matrix, two boundary surfaces (or interfaces) structured by the incident medium, the thin film layer, and the substrate can be attributed to one boundary surface expressed by the equivalent optical admittance for purposes of the thin film calculation.

Figure 2A:
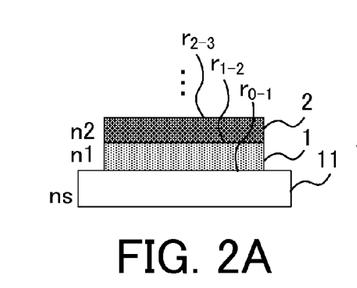
FIGS. 2A-2C are views for explaining an equivalent optical admittance of a thin layer.

For example, assume, as illustrated in FIG. 2A, that light is normally incident upon interface $r_{0-1}$ between the substrate 11 and the thin film layer 1, and interface $r_{1-2}$ between the thin film layers 1 and 2. The following expression is established where Et is an electric field in the interface $r_{0-1}$, Ht is a magnetic field strength, Ei is an electric field in the interface $r_{1-2}$, Hi is a magnetic field strength, δ is a phase difference in the thin film layer 1, and $\eta_1$ is an optical admittance of the thin film layer 1 (which is equivalent to the refractive index n1 of the thin film layer 1):

$$\begin{bmatrix} Ei \\ Hi \end{bmatrix} = \begin{bmatrix} \cos\delta & \dfrac{i}{\eta_1}\sin\delta \\ i\eta_1 \sin\delta & \cos\delta \end{bmatrix} * \begin{bmatrix} Et \\ Ht \end{bmatrix} \quad (2)$$

Expression (2) is modified as follows using the optical admittance of the substrate, Y=Et/Ht(=ns).

$$\begin{bmatrix} B \\ C \end{bmatrix} = \begin{bmatrix} \cos\delta & \dfrac{i}{\eta_1}\sin\delta \\ i\eta_1 \sin\delta & \cos\delta \end{bmatrix} * \begin{bmatrix} 1 \\ Yt \end{bmatrix} \quad (3)$$

Figure 2B:
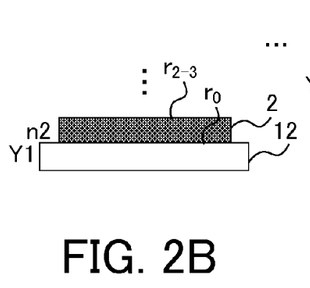
Figure 2C:
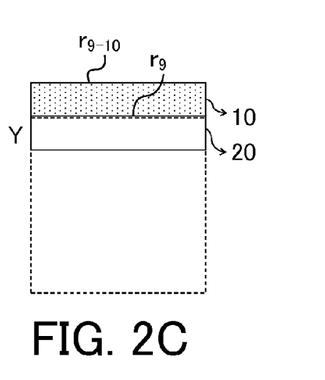

Y1 that is set to B/C is an equivalent optical admittance of the substrate 11 and the thin film layer 1 calculated from the interfaces $r_{0-1}$ and $r_{1-2}$ and the thin film layer 1, and consequently as in FIG. 2B instead of the structure of FIG. 2A by treating the interfaces $r_{0-1}$ and $r_{1-2}$ as a layer 12 of the equivalent refractive index Y1. By sequentially repeating this procedure, the final thin film structure can be simplified to a structure in which the thin film layer 10 as the uppermost layer is laminated on a substrate 20 having an equivalent optical admittance Y of the undercoat layer that includes the substrate 11 to the thin film layer 9.

In general, when a monolayer antireflection film is applied to a surface having a substrate refractive index N, the optimal condition of the refractive index of the thin film layer is $\sqrt{N}$ where the incident medium is air. Thus, the equivalent optical admittance Y and the refractive index nd of the thin film layer of the undercoat layer may be selected as $nd = \sqrt{Y}$.

The optical admittance changes according to the polarization of light because the reflectance of the oblique incident light flux change according to whether the light is p-polarized light or s-polarized light. The optical admittances $\eta_{ip}$ and $\eta_{is}$ of each layer to the p-polarized light and the s-polarized light are expressed as follows where ni (i is a layer number) is a refractive index of each thin film layer, and θi is a refractive angle of light that goes straight in each thin film layer found by the Snell's law:

$$p\text{-polarized light}: n_{ip} = ni * \cos\theta i \quad (4)$$

$$s\text{-polarized light}: n_{is} = ni / \cos\theta i \quad (5)$$

The natural light may be considered unpolarized light, and the optical admittance Y of the oblique incidence may be treated as an average value between the p-polarized light and the s-polarized light. However, changes of the optical admittances $\eta_{ip}$ and $\eta_{is}$ according to the incident angle are different in the oblique incidence. In particular, there is no contribution by the Brewster angle in the s-polarized light, and the optical admittance uniformly increases as the incident angle increases. It is thus difficult to simultaneously reduce reflections of the normal incidence and the oblique incidence, in particular, at the high incident angle.

The equivalent optical admittance of the laminated thin film can be controlled by the refractive index and the thickness of the thin film layer. In order to obtain the law-reflection antireflection film in the predetermined wavelength range and the incident angle range, the square root $\sqrt{Y}(\theta, \lambda)$ of the equivalent optical admittance of the undercoat layer for the arbitrary incident angle θ and the wavelength λ upon the thin film layer 1 may fall in a predetermined range with respect to the reflectance nd of the thin film layer 10. More specifically, the optical admittance Y may satisfy the conditional expression (1) or be nd or smaller and nd-0.1 or larger for θ in a range from 0° to 60° and a wavelength λ in a visible range from 420 nm to 680 nm.

It is necessary to satisfy the conditional expression (1) and to set the refractive index nd of the thin film layer 10 in a range of 1.20 to 1.30. The refractive index of the thin film layer 10 set to the above range can secure the film strength necessary for the manufacture process and restrain the reflection to a high incident angle. When the refractive index nd of the uppermost layer is higher than the above range, the optimal value $\sqrt{Y}$ of the optical admittance in the oblique incidence increases and the change of the optical admittance caused by the incident angle increases. It is therefore difficult to properly restrain the reflectance characteristics for both the normal incidence and the oblique incidence. On the other hand, the refractive index of the uppermost layer lower than 1.20 weakens the film strength due to the film density reduction (or volume population reduction) caused by the low refractive index change and makes hard handling and cleansing in the manufacture process.

The thin film layer 10 is made of a material having a low refractive index, such as $SiO_2$ and $MgF_2$. The thin film layer 10 may possess a low volume population that contains nanovoids for a lower refractive index, and may contain hollow nanoparticles as a primary ingredient. The hollow nanoparticles may realize a high film strength and a low refractive index when they are combined with each other by the binder, as well as a refractive index of 1.20 to 1.30 when the ratio among air (having a refractive index of 1.0) contained in the hollow nanoparticle, the hollow nanoparticle, and the binder. Moreover, the void in the hollow nanoparticle can prevent adhesions of water and impurities to the inside the void, improve the environmental resistance, and provides a stable characteristic having no refractive index changes. At this time, an average particle diameter of the hollow nanoparticle may be one fifth as large as the employed wavelength or smaller so as to restrain the light scattering, or 80 nm, which is one fifth as long as the shortest wavelength of the visible light of 400 nm, or smaller.

Since the nanoparticles may be combined by the binder, manufacturing may use the sol-gel method. The coating method is not particularly limited, and a general coating method of a coating solution may be used, such as a dip coating method, a spin coating method, a spray coating method, and a roll coating method. The spin coating method using a coating material is suitable for forming a film having a uniform film thickness on a substrate having a curved surface, such as a lens. Drying follows the coating. Drying may use a dryer, a hot plate, and an electric furnace. The dry condition may employ the temperature and time that do not affect the base material but can evaporate the organic solvent. In general, the operating temperature is lower than 300° C. The coating number may usually once, but drying and coating may be repeated plural times.

The thin film layers 1 to 9 other than the uppermost layer may be formed by the dry film formation, such as the vacuum vapor deposition and sputtering for stable film density and mass-production purposes. As long as the thin film layers 1 to 9 formed by the dry film formation may be made of a transparent material in the visible wavelength range, a variety of materials may be used.

When the hollow nanoparticle is used for the thin film layer 10, the thin film layer 10 and the neighboring thin film layer 9 may be made of similar materials. For example, when the hollow nanoparticle is a hollow silica nanoparticle, the thin film layer 9 may be made of $SiO_2$ or a layer made of a compound containing $SiO_2$, and the binder may be made of the similar material. This configuration can enhance the adhesion and stabilize coating.

The thin film layers 2, 4, 6, and 8 each has a refractive index of 2.00 to about 2.40, which is a high refractive index in the thin layers in the antireflection film 100. A material of the high refractive index layer may use oxide of titanium, tantalum, zirconium, chrome, niobium, cerium, hafnium, and yttrium, singularly or a mixture of them.

The thin film layers 9 and 10 each has a low refractive index, and a material of the low refractive index may be silicon oxide solely or a mixture of the silicon oxide. The thin film layers 1, 3, 5, and 7 each has an intermediate refractive index of 1.55 to 1.70 where the thin film layer 1 is closest to the substrate 11. The repetitive layer with the high refractive index layer does not have a low refractive index of 1.4 to 1.5, but is a thin film layer having a refractive layer of about 1.60 so as to form a film having a stable reflection and restrained ripples.

A material of the intermediate refractive index layer may be alumina ($Al_2O_3$) or a compound containing alumina. In particular, the thin film layer 1 may be made of aluminum oxide solely so as to protect the substrate. Thus, the antireflection film 100 contains at least three types of laminated films having different refractive indices and materials. The substrate on which the antireflection film 100 is formed may be made of glass, plastic, resin, etc., having a plane surface, a curved surface, etc. and an arbitrary refractive index.

Figure 3A:
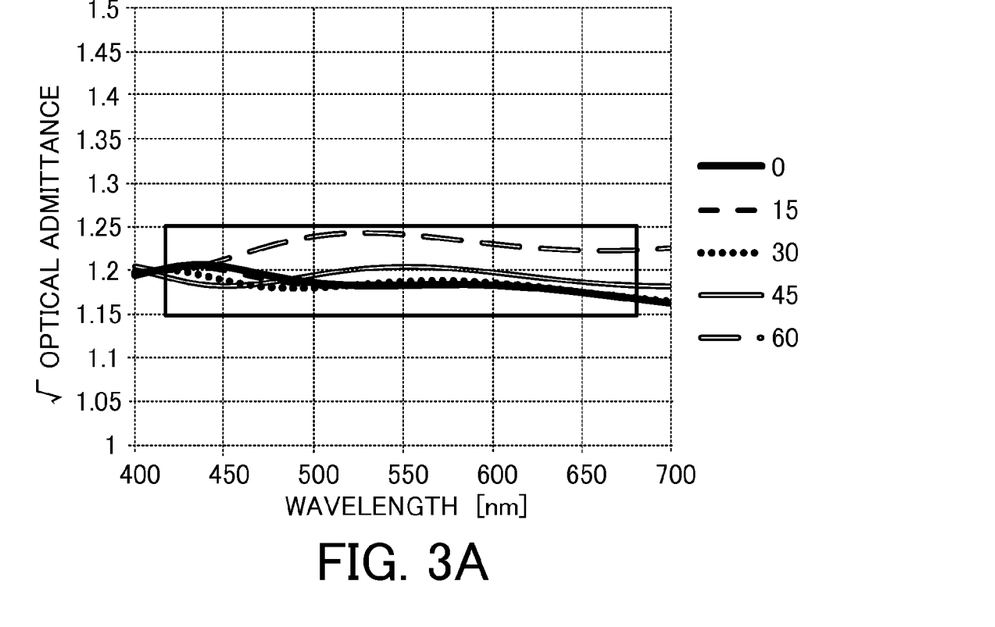
FIGS. 3A and 3B are views of a spectral optical admittance and reflectance of a representative embodiment according to the present invention.
Figure 3B:
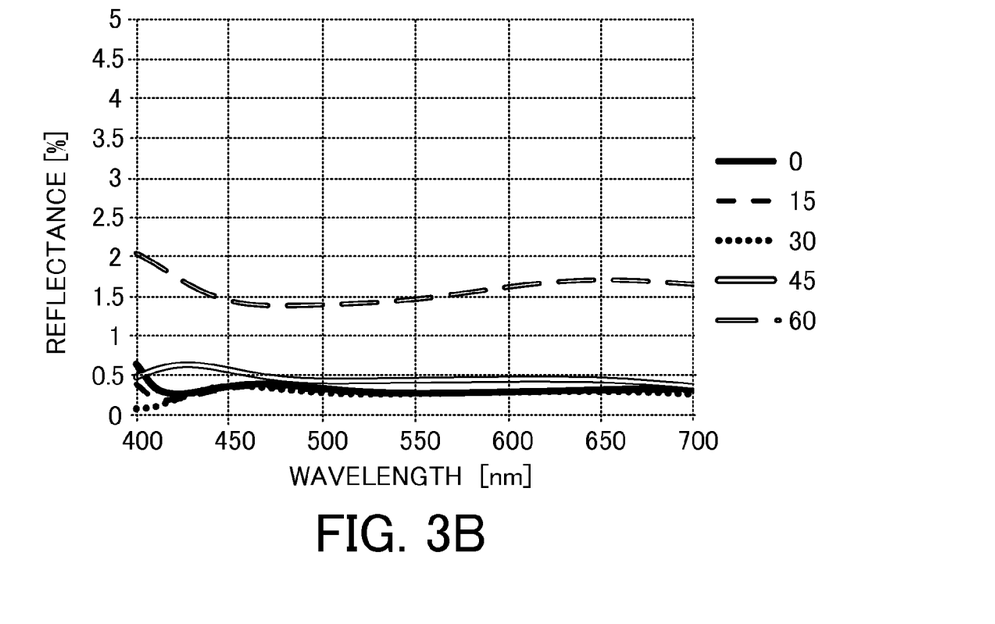

Table 1 summarizes a concrete film structure example, and FIG. 3A illustrates a spectral characteristic and an angular characteristic of an optical admittance Y of an undercoat layer in the film structure in Table 1. The abscissa axis denotes a wavelength (nm) from 400 nm to 700 nm, and the ordinate axis denotes an optical admittance. A line type illustrates different incident angles θ of 0°, 15°, 30°, 45°, and 60°. FIG. 3A is a graph of a calculated result of an optical admittance $\sqrt{Y}$ of the undercoat layer with a wavelength from 400 nm to 700 nm and the incident angles of 0°, 15°, 30°, 45°, and 60°. The square root of the optical admittance falls in a range (within a frame in FIG. 3A) from 1.15 to 1.25 defined in the conditional expression (1) for all incident angles in a wavelength range from 420 nm to 680 nm. FIG. 3B illustrates a spectral reflectance at this time. It is understood that a low-reflection flat profile is obtained in the incident angle range from 0° to 60°. The description of the abscissa axis and ordinate axis of FIGS. 3A and 3B is also applied to FIGS. 4A and 4B and subsequent graphs.

In Table 1, the refractive index to the d-line of the substrate falls in a range from 1.50 to 2.00 (herein 1.80) and the thickness of the tenth layer is 110.00 nm to 135.00 nm (herein 128.21 nm).

A plurality of thin film layers except the thin film layer 10 includes at least one pair (four pairs herein) of an intermediate refractive index layer having a refractive index of 1.61 and a high refractive index layer having a refractive index of 2.09 in order from the substrate 11 to the thin film layer 10. The thin film layer 9 serves as a low refractive index layer having a refractive index of 1.45 and is provided between the thin film layer 10 and the thin film layer 8 that is a high refractive index layer closest to the thin film layer 10. The thin film layer 6, one of the plurality of high refractive index layers, is thicker than each of the thin film layers 5 and 7 as upper and lower intermediate refractive index layer, and thicker than the thin film layer 10.

One method of securing the antireflection characteristic at a high incident angle is a method of forming an antireflection film in a wider band than the designed wavelength. Since the antireflection film comes to have a higher reflectance on the long wavelength side as the incident angle increases, the low reflection characteristic can be maintained in the visible range at the high incident angle by maintaining the reflectance on the long wavelength band lower than the designed wavelength band.

Figure 4A:
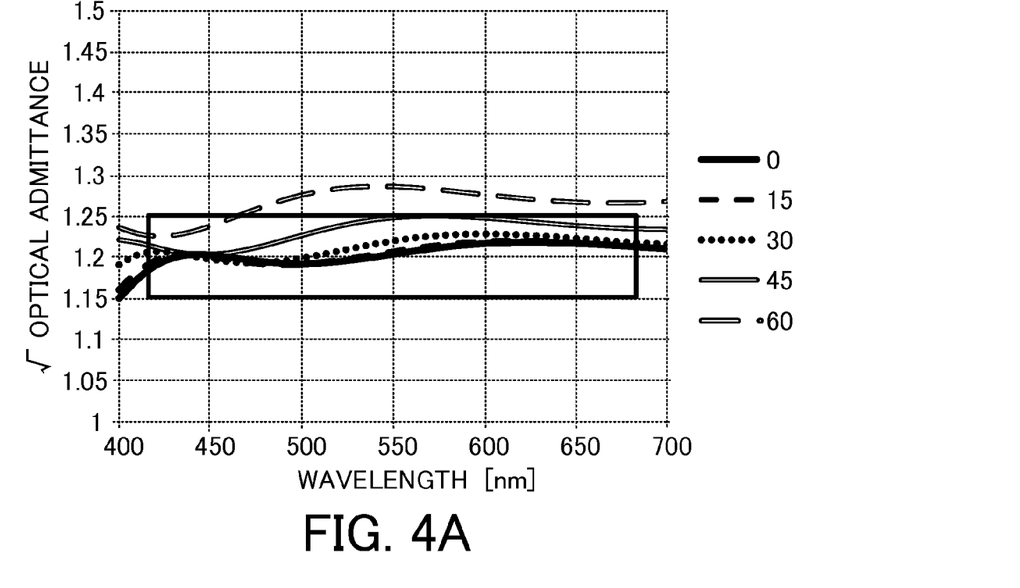
FIGS. 4A and 4B are views of a spectral optical admittance and reflectance according to a comparative example.
Figure 4B:
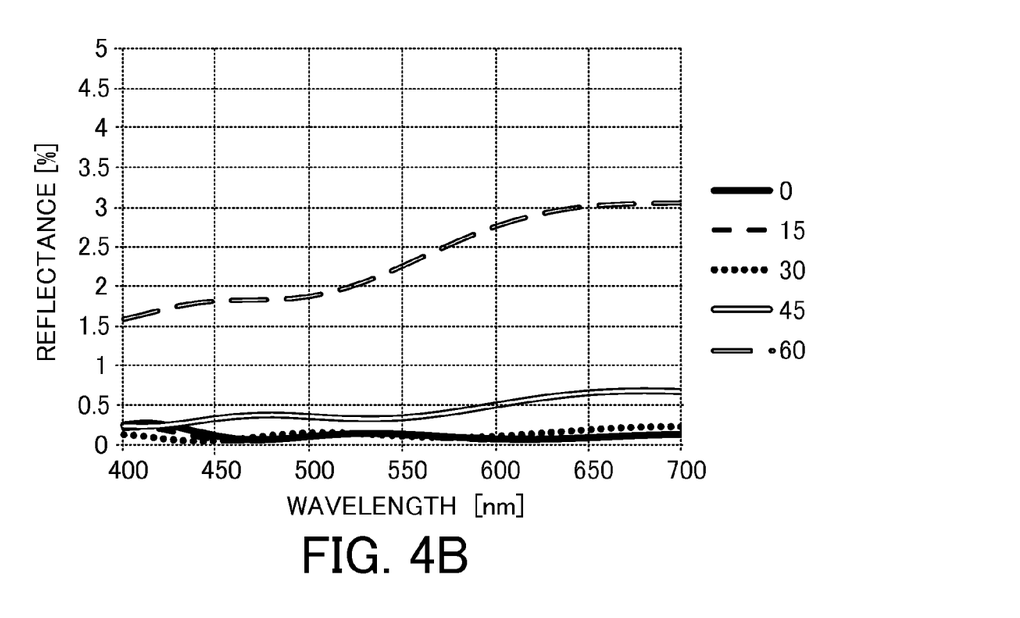

FIGS. 4A and 4B are graphs of an angular characteristic of an optical admittance and a spectral-reflectance angular characteristic a ten-layer film according to comparative example 1 that is a designed example in which a reflectance is restrained in a range from 400 nm to about 1,000 nm. The wavelength up to 700 nm is illustrated.

It is understood from FIG. 4A that the optical admittance of the comparative example exceeds a range (or a frame in FIG. 4A) of the conditional expression (1) at the incident angle of 60°. It is understood from FIG. 4B that a sufficiently low reflection characteristic can be obtained with the incident angle of 0° to 45° in the wavelength range up to 700 nm, but the reflection increases on the long wavelength side at the high incident angle. Therefore, stray light occurs at this incident angle, for example, in an optical apparatus, and when that light reaches a detector or image sensor, red ghost or flare occurs deteriorating the detection precision and the image pickup quality. On the other hand, the antireflection film 100 can maintain a low reflection at an incident angle up to 60° irrespective of the wavelength, and thus can provide a high quality image.

The antireflection film 100 is not limited to the ten-layer structure illustrated in FIG. 1 but may contain eleven layers or nine layers. It is necessary to increase the number of layers so as to restrain a change of the optical admittance in a wide wavelength band and a wide incident angle range. Therefore, a laminated nine layers or more may be necessary.

TABLE 1

| | | Film reflectance | Embodiment_Thickness |
|---|---|---|---|
| Thin film layer | 10 | 1.25 | 128.21 |
| | 9 | 1.45 | 8.00 |
| | 8 | 2.09 | 8.75 |
| | 7 | 1.61 | 59.17 |
| | 6 | 2.09 | 141.12 |
| | 5 | 1.61 | 26.40 |
| | 4 | 2.09 | 29.30 |
| | 3 | 1.61 | 39.10 |
| | 2 | 2.09 | 16.78 |
| | 1 | 1.61 | 14.40 |
| Substrate reflectance | | | 1.80 |

TABLE 2

| | | Film reflectance | Comparative example_thickness |
|---|---|---|---|
| Thin film layer | 10 | 1.25 | 119.60 |
| | 9 | 1.45 | 10.00 |
| | 8 | 2.09 | 12.40 |
| | 7 | 1.61 | 51.10 |
| | 6 | 2.09 | 152.60 |
| | 5 | 1.61 | 30.00 |
| | 4 | 2.09 | 29.70 |
| | 3 | 1.61 | 56.80 |
| | 2 | 2.09 | 18.80 |
| | 1 | 1.61 | 33.20 |
| Substrate reflectance | | | 1.80 |

Embodiment 1

An antireflection film according to embodiment 1 has ten layers illustrated in FIG. 1 on a glass substrate having a refractive index of 1.5 to 2.0 and a film structure and a film thickness illustrated in Table 3. Numerical values in Table 3 indicate a physical film thickness [nm]. The thin film layers 1 to 9 are formed by the vacuum evaporation method, and the thin film layer 10 is formed by coating hollow $SiO_2$ mixture preparation that is prepared to have a refractive index of 1.25, with a spin coater, and by sintering it for one hour.

In Table 3, the refractive index of the substrate to the d-line ranges from 1.50 to 2.00. The thickness of the tenth layer ranges from 110.0 nm to 135.00 nm (more specifically from 122.01 nm to 129.50 nm).

A plurality of thin film layers except the thin film layer 10 includes at least one pair (four pairs herein) of an intermediate refractive index layer having a refractive index of 1.61 and a high refractive index layer having a refractive index of 2.09 in order from the substrate 11 to the thin film layer 10. The thin film layer 9 serves as a low refractive index layer having a refractive index of 1.45 and is provided between the thin film layer 10 and the thin film layer 8 that is a high refractive index layer closest to the thin film layer 10. The thin film layer 6, one of the plurality of high refractive index layers, is thicker than each of the thin film layers 5 and 7 as upper and lower intermediate refractive index layer, and thicker than the thin film layer 10 in embodiment 1-3 to 1-6.

TABLE 3

| | | Film reflectance | Embodiment 1-1 | 1-2 | 1-3 |
|---|---|---|---|---|---|
| Thin film layer | 10 | 1.25 | 122.01 | 127.91 | 128.95 |
| | 9 | 1.45 | 23.34 | 10.00 | 8.00 |
| | 8 | 2.09 | 10.00 | 10.00 | 8.51 |
| | 7 | 1.61 | 54.33 | 56.84 | 58.20 |
| | 6 | 2.09 | 71.48 | 69.50 | 133.60 |
| | 5 | 1.61 | 10.00 | 10.04 | 26.25 |
| | 4 | 2.09 | 52.86 | 44.14 | 22.80 |
| | 3 | 1.61 | 40.06 | 40.68 | 43.70 |
| | 2 | 2.09 | 19.03 | 11.53 | 10.80 |
| | 1 | 1.61 | 116.61 | 61.27 | 21.70 |
| Substrate reflectance | | | 1.50 | 1.60 | 1.70 |

| | | Film reflectance | Embodiment 1-4 | 1-5 | 1-6 |
|---|---|---|---|---|---|
| Thin film layer | 10 | 1.25 | 128.21 | 128.20 | 129.50 |
| | 9 | 1.45 | 8.00 | 8.00 | 8.00 |
| | 8 | 2.09 | 8.75 | 8.85 | 9.14 |
| | 7 | 1.61 | 59.17 | 58.86 | 59.34 |
| | 6 | 2.09 | 141.12 | 142.60 | 148.10 |
| | 5 | 1.61 | 26.40 | 24.98 | 22.98 |
| | 4 | 2.09 | 29.30 | 33.05 | 40.50 |
| | 3 | 1.61 | 39.10 | 34.56 | 27.90 |
| | 2 | 2.09 | 16.78 | 22.90 | 36.80 |
| | 1 | 1.61 | 14.40 | 13.47 | 10.74 |
| Substrate reflectance | | | 1.80 | 1.90 | 2.00 |

Figure 5A:
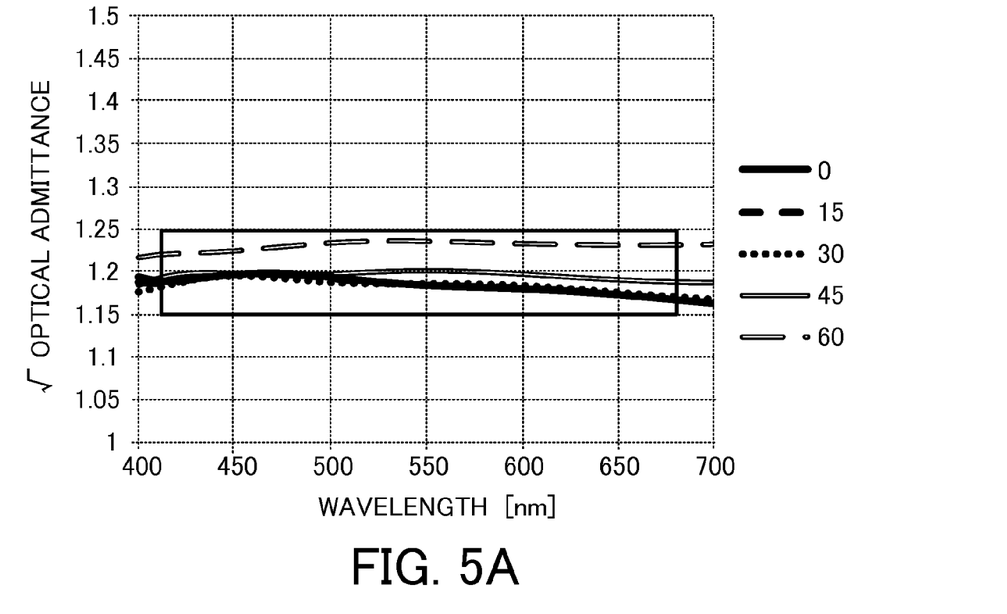
FIGS. 5A and 5B are views of a spectral optical admittance and reflectance according to embodiment 1 of the present invention.

FIG. 5A is a graph of an optical admittance $\sqrt{Y}$ of the undercoat layer at the incident angles 0°, 15°, 30°, 45°, and 60° with a wavelength in a range from 400 nm to 700 nm according to the embodiments 1 and 2 in which the substrate refractive index is 1.60 as represented in Table 3. It is understood that the square root of the optical admittance falls in a range (or a frame in FIG. 5A) from 1.15 to 1.25 defined in the conditional expression (1) with all incident angles in a wavelength range from 420 nm to 680 nm.

Figure 5B:
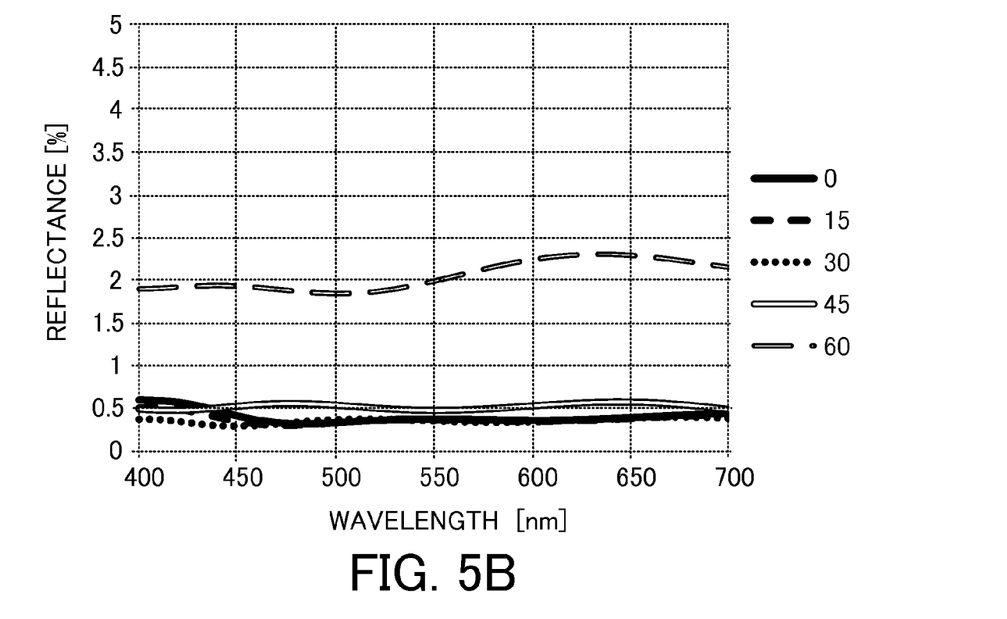

FIG. 5B is a graph of a spectral reflectance at each incident angle with a wavelength in a range from 400 nm to 700 nm according to the embodiment 1-2. The spectral reflectance is less than about 0.5% up to the incident angle of 45°, and less than 2% at the incident angle of 60°. FIGS. 3A and 3B illustrate the same result as the embodiment 1-4.

Table 4 summarizes an average value, a maximum value, a minimum value, of the optical admittance and the average reflectance and the maximum reflectance and a difference value between them at each incident angle and a wavelength range from 420 nm to 680 nm according to the embodiment 1-1 to 1-6. It is understood from this table that the optical admittance falls within a range (from 1.15 to 1.25) of the conditional expression 1, and the variation of the reflectance is maintained 0.4% or less.

Comparative example 1 illustrates a characteristic that does not satisfies the conditional expression (1). The film structure is similar to Table 2, and the optical admittance and the spectral reflectance are similar to those illustrated in FIGS. 4A and 4B. Therefore, a detailed description will be omitted. Table 5 summarizes an average value, a maximum value, a minimum value, of the optical admittance and the average reflectance and the maximum reflectance and a difference value between them at each incident angle and a wavelength range from 420 nm to 680 nm according to the comparative example 1. The reflection on the long wavelength side becomes higher in the oblique incidence in particular, at the incident angle of 60°, and a difference spreads by up to 0.75% between the average reflectance and the maximum reflectance.

In summary, the antireflection film according to this embodiment is a high-performance low-reflection antireflection film having a flat wavelength characteristic over a wide incident angle range.

TABLE 4

|  | 0 deg | 15 deg | 30 deg | 45 deg | 60 deg |
|---|---|---|---|---|---|
| Embodiment 1-1_Y | | | | | |
| Ave | 1.18 | 1.18 | 1.19 | 1.20 | 1.23 |
| Max | 1.20 | 1.20 | 1.20 | 1.21 | 1.25 |
| min | 1.18 | 1.18 | 1.17 | 1.18 | 1.21 |
| Embodiment 1-2_Y | | | | | |
| Ave | 1.18 | 1.18 | 1.18 | 1.20 | 1.23 |
| Max | 1.20 | 1.20 | 1.19 | 1.21 | 1.24 |
| min | 1.17 | 1.17 | 1.17 | 1.18 | 1.22 |
| Embodiment 1-3_Y | | | | | |
| Ave | 1.19 | 1.19 | 1.19 | 1.20 | 1.23 |
| Max | 1.21 | 1.21 | 1.20 | 1.21 | 1.25 |
| min | 1.17 | 1.17 | 1.17 | 1.18 | 1.20 |
| Embodiment 1-4_Y | | | | | |
| Ave | 1.19 | 1.18 | 1.18 | 1.19 | 1.23 |
| Max | 1.21 | 1.20 | 1.20 | 1.21 | 1.24 |
| min | 1.17 | 1.17 | 1.17 | 1.18 | 1.20 |
| Embodiment 1-5_Y | | | | | |
| Ave | 1.19 | 1.19 | 1.19 | 1.20 | 1.23 |
| Max | 1.21 | 1.21 | 1.21 | 1.22 | 1.24 |
| min | 1.16 | 1.16 | 1.15 | 1.17 | 1.22 |
| Embodiment 1-6_Y | | | | | |
| Ave | 1.19 | 1.19 | 1.19 | 1.20 | 1.23 |
| Max | 1.22 | 1.22 | 1.22 | 1.23 | 1.24 |
| min | 1.16 | 1.16 | 1.16 | 1.18 | 1.22 |
| Embodiment 1-1_R | | | | | |
| Average reflectance | 0.37 | 0.34 | 0.31 | 0.47 | 2.02 |
| Maximum reflectance | 0.63 | 0.53 | 0.36 | 0.54 | 2.36 |
| Difference value | 0.25 | 0.18 | 0.05 | 0.07 | 0.35 |
| Embodiment 1-2_R | | | | | |
| Average reflectance | 0.39 | 0.36 | 0.34 | 0.51 | 2.04 |
| Maximum reflectance | 0.56 | 0.48 | 0.38 | 0.56 | 2.30 |
| Difference value | 0.18 | 0.12 | 0.05 | 0.05 | 0.26 |
| Embodiment 1-3_R | | | | | |
| Average reflectance | 0.46 | 0.43 | 0.38 | 0.51 | 1.94 |
| Maximum reflectance | 0.64 | 0.57 | 0.48 | 0.59 | 2.12 |
| Difference value | 0.18 | 0.14 | 0.10 | 0.08 | 0.18 |
| Embodiment 1-4_R | | | | | |
| Average reflectance | 0.41 | 0.38 | 0.34 | 0.49 | 1.97 |
| Maximum reflectance | 0.66 | 0.56 | 0.38 | 0.53 | 2.22 |
| Difference value | 0.26 | 0.18 | 0.04 | 0.04 | 0.25 |
| Embodiment 1-5_R | | | | | |
| Average reflectance | 0.42 | 0.38 | 0.34 | 0.48 | 1.97 |
| Maximum reflectance | 0.77 | 0.67 | 0.45 | 0.62 | 2.29 |
| Difference value | 0.36 | 0.29 | 0.11 | 0.13 | 0.32 |
| Embodiment 1-6_R | | | | | |
| Average reflectance | 0.41 | 0.37 | 0.33 | 0.48 | 1.95 |
| Maximum reflectance | 0.64 | 0.54 | 0.38 | 0.53 | 2.16 |
| Difference value | 0.23 | 0.17 | 0.05 | 0.05 | 0.22 |

TABLE 5

|  | 0 deg | 15 deg | 30 deg | 45 deg | 60 deg |
|---|---|---|---|---|---|
| Comparative example 1_Y | | | | | |
| Ave | 1.20 | 1.20 | 1.21 | 1.23 | 1.26 |
| Max | 1.22 | 1.22 | 1.23 | 1.25 | 1.29 |
| min | 1.19 | 1.19 | 1.19 | 1.20 | 1.23 |
| Comparative example 1_R | | | | | |
| Average reflectance | 0.12 | 0.11 | 0.13 | 0.42 | 2.30 |
| Maximum reflectance | 0.26 | 0.20 | 0.23 | 0.67 | 3.05 |
| Difference value | 0.14 | 0.09 | 0.10 | 0.26 | 0.75 |

Embodiment 2

Figure 6:
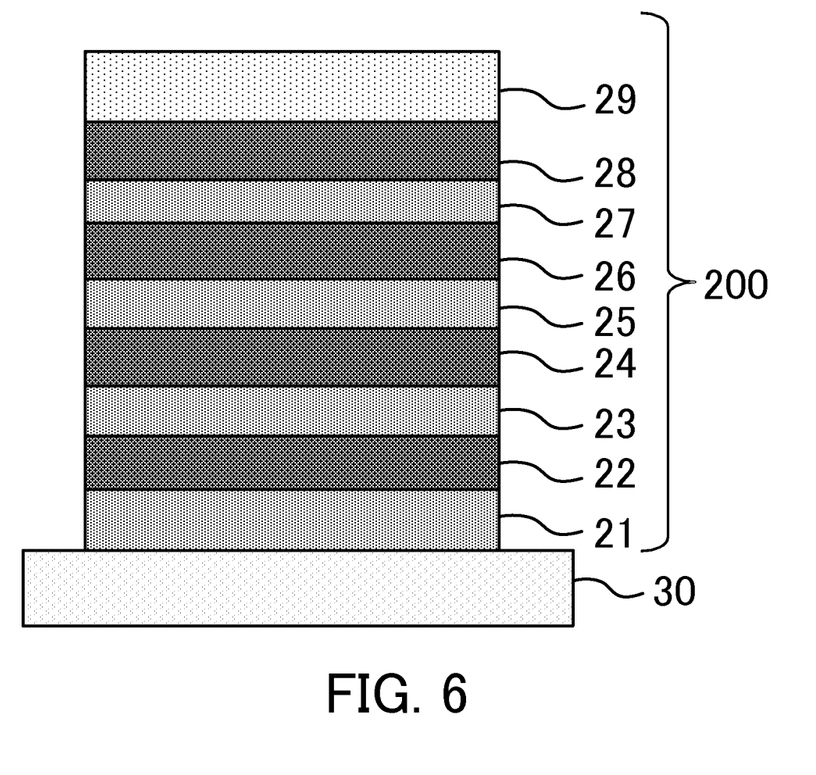
FIG. 6 is a schematic structural view of an antireflection film according to embodiment 2 of the present invention.

An antireflection film according to embodiment 2 has nine layers illustrated in FIG. 6 on a glass substrate 30 having a refractive index of 1.5 to 2.0 and a film structure and a film thickness illustrated in Table 6. Numerical values in Table 6 indicate a physical film thickness [nm]. The thin film layers 21 to 28 are formed by the vacuum evaporation method, and the thin film layer 29 is formed by coating hollow $SiO_2$ mixture preparation that is prepared to have a refractive index of 1.25, with a spin coater, and by sintering it for one hour.

TABLE 6

| Film | | Film reflectance | Embodiment 1-1 | Embodiment 1-2 | Embodiment 1-3 |
|---|---|---|---|---|---|
| Thin film layer | 29 | 1.25 | 132.57 | 133.60 | 129.90 |
| | 28 | 2.09 | 9.28 | 11.40 | 9.22 |
| | 27 | 1.61 | 65.26 | 54.93 | 60.01 |
| | 26 | 2.09 | 47.12 | 91.10 | 135.54 |
| | 25 | 1.61 | 14.72 | 8.00 | 29.97 |
| | 24 | 2.09 | 38.55 | 35.15 | 23.58 |
| | 23 | 1.61 | 24.49 | 42.16 | 54.97 |
| | 22 | 2.09 | 12.09 | 11.79 | 11.77 |
| | 21 | 1.61 | 77.42 | 124.20 | 28.08 |
| Substrate reflectance | | | 1.50 | 1.60 | 1.70 |

| Film | | Film reflectance | Embodiment 1-4 | Embodiment 1-5 | Embodiment 1-6 |
|---|---|---|---|---|---|
| Thin film layer | 29 | 1.25 | 130.88 | 131.01 | 132.71 |
| | 28 | 2.09 | 9.52 | 9.51 | 9.88 |
| | 27 | 1.61 | 59.92 | 60.06 | 60.51 |
| | 26 | 2.09 | 138.71 | 140.33 | 144.63 |
| | 25 | 1.61 | 27.90 | 27.55 | 25.15 |
| | 24 | 2.09 | 28.28 | 31.41 | 37.30 |
| | 23 | 1.61 | 44.33 | 40.71 | 31.98 |
| | 22 | 2.09 | 17.89 | 23.95 | 35.14 |
| | 21 | 1.61 | 19.59 | 17.99 | 13.20 |
| Substrate reflectance | | | 1.80 | 1.90 | 2.00 |

In Table 6, the refractive index of the substrate 30 to the d-line ranges from 1.50 to 2.00. The thickness of the uppermost, the ninth layer ranges from 110.0 nm to 135.00 nm (more specifically from 129.90 nm to 133.60 nm).

A plurality of thin film layers except the thin film layer 29 includes at least one pair (four pairs herein) of an intermediate refractive index layer having a refractive index of 1.61 and a high refractive index layer having a refractive index of 2.09 in order from the substrate 30 to the thin film layer 29. The thin film layer 28 closest to the thin film layer 29 contacts the thin film layer 29.

Figure 7A:
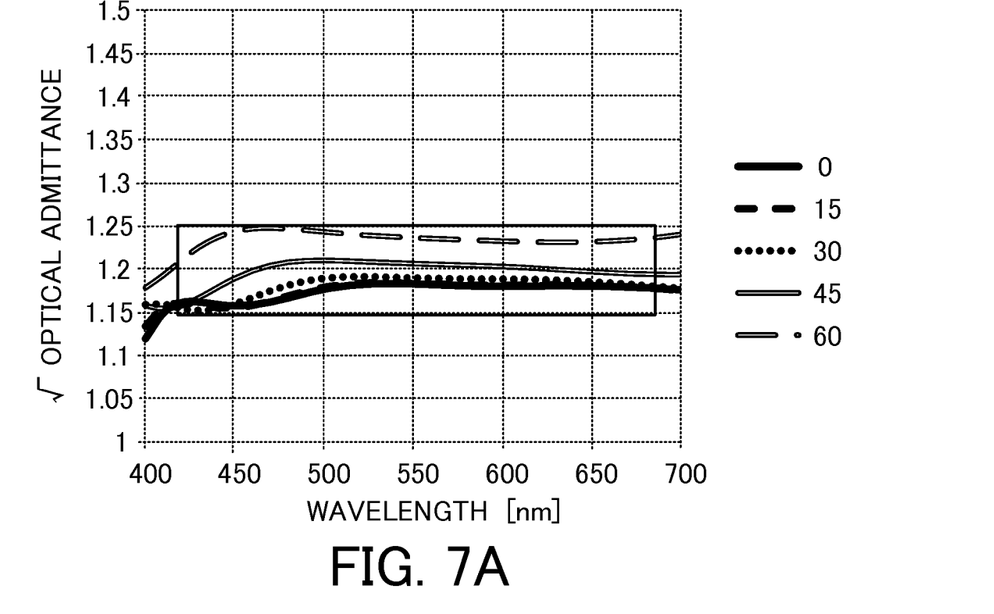
FIGS. 7A and 7B are views of a spectral optical admittance and reflectance according to the embodiment 2 of the present invention.

FIG. 7A is a graph of an optical admittance $\sqrt{Y}$ of the undercoat layer at the incident angles 0°, 15°, 30°, 45°, and 60° with a wavelength in a range from 400 nm to 700 nm according to the embodiment 2-6 having a substrate refractive index of 2.0 as one representative example in Table 6. It is understood that the square root of the optical admittance falls in a range (a frame in FIG. 7A) from 1.15 to 1.25 defined in the conditional expression (1) with all incident angles in a wavelength range from 420 nm to 680 nm.

Figure 7B:
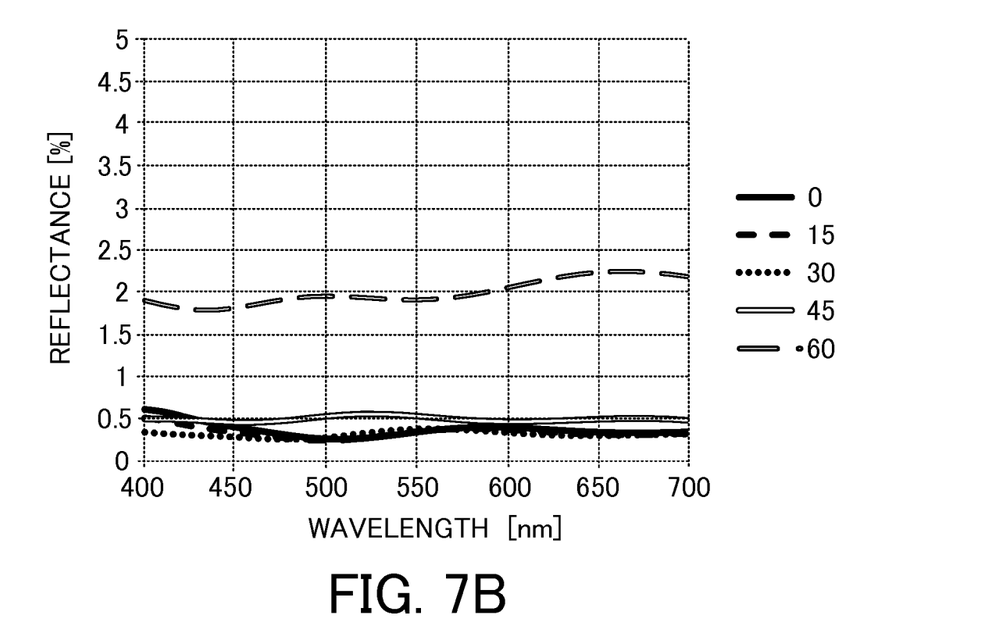

FIG. 7B is a graph of a spectral reflectance at each incident angle with a wavelength in a range from 400 nm to 700 nm according to the embodiment 2-6. The spectral reflectance is less than 0.5% up to the incident angle of 45°, and less than 2% at the incident angle of 60°. It is understood that there is little heave on a long wavelength side and a low reflection is maintained over a visible wavelength band.

Table 7 summarizes an average value, a maximum value, a minimum value, of the optical admittance and the average reflectance and the maximum reflectance and a difference value between them at each incident angle and a wavelength range from 420 nm to 680 nm according to the embodiment 2-1 to 2-6. It is understood from this table that the optical admittance falls within the range (from 1.15 to 1.25) of the conditional expression 1, and the variation of the reflectance is maintained 0.4% or less.

In summary, the antireflection film according to this embodiment is a high-performance low-reflection antireflection film having a flat wavelength characteristic over a wide incident angle range.

TABLE 7

|  | 0 deg | 15 deg | 30 deg | 45 deg | 60 deg |
|---|---|---|---|---|---|
| Embodiment 2-1_Y | | | | | |
| Ave | 1.17 | 1.17 | 1.18 | 1.20 | 1.23 |
| Max | 1.18 | 1.18 | 1.19 | 1.21 | 1.25 |
| min | 1.15 | 1.16 | 1.17 | 1.18 | 1.22 |
| Embodiment 2-2_Y | | | | | |
| Ave | 1.17 | 1.17 | 1.18 | 1.20 | 1.23 |
| Max | 1.18 | 1.18 | 1.19 | 1.21 | 1.25 |
| min | 1.15 | 1.14 | 1.16 | 1.18 | 1.22 |
| Embodiment 2-3_Y | | | | | |
| Ave | 1.17 | 1.17 | 1.18 | 1.20 | 1.24 |
| Max | 1.19 | 1.19 | 1.20 | 1.21 | 1.25 |
| min | 1.15 | 1.15 | 1.15 | 1.17 | 1.23 |
| Embodiment 2-4_Y | | | | | |
| Ave | 1.17 | 1.17 | 1.18 | 1.20 | 1.24 |
| Max | 1.18 | 1.19 | 1.19 | 1.21 | 1.25 |
| min | 1.15 | 1.15 | 1.15 | 1.17 | 1.23 |
| Embodiment 2-5_Y | | | | | |
| Ave | 1.17 | 1.18 | 1.18 | 1.20 | 1.23 |
| Max | 1.18 | 1.19 | 1.19 | 1.21 | 1.24 |
| min | 1.15 | 1.15 | 1.16 | 1.17 | 1.23 |
| Embodiment 2-6_Y | | | | | |
| Ave | 1.17 | 1.17 | 1.18 | 1.20 | 1.23 |
| Max | 1.18 | 1.18 | 1.19 | 1.21 | 1.25 |
| min | 1.16 | 1.16 | 1.15 | 1.16 | 1.21 |
| Embodiment 2-1_R | | | | | |
| Average reflectance | 0.39 | 0.36 | 0.33 | 0.50 | 2.02 |
| Maximum reflectance | 0.61 | 0.52 | 0.38 | 0.57 | 2.30 |
| Difference value | 0.22 | 0.15 | 0.05 | 0.07 | 0.28 |
| Embodiment 2-2_R | | | | | |
| Average reflectance | 0.40 | 0.37 | 0.33 | 0.46 | 1.90 |
| Maximum reflectance | 0.60 | 0.53 | 0.37 | 0.50 | 2.07 |
| Difference value | 0.20 | 0.15 | 0.04 | 0.04 | 0.17 |

TABLE 7-continued

|  | 0 deg | 15 deg | 30 deg | 45 deg | 60 deg |
|---|---|---|---|---|---|
| Embodiment 2-3_R | | | | | |
| Average reflectance | 0.38 | 0.36 | 0.34 | 0.52 | 2.02 |
| Maximum reflectance | 0.46 | 0.44 | 0.41 | 0.56 | 2.22 |
| Difference value | 0.07 | 0.08 | 0.07 | 0.05 | 0.20 |
| Embodiment 2-4_R | | | | | |
| Average reflectance | 0.38 | 0.35 | 0.33 | 0.50 | 2.01 |
| Maximum reflectance | 0.55 | 0.45 | 0.35 | 0.53 | 2.26 |
| Difference value | 0.17 | 0.10 | 0.03 | 0.03 | 0.25 |
| Embodiment 2-5_R | | | | | |
| Average reflectance | 0.39 | 0.36 | 0.33 | 0.49 | 2.01 |
| Maximum reflectance | 0.64 | 0.55 | 0.44 | 0.62 | 2.35 |
| Difference value | 0.25 | 0.19 | 0.11 | 0.13 | 0.34 |
| Embodiment 2-6_R | | | | | |
| Average reflectance | 0.38 | 0.35 | 0.32 | 0.49 | 2.00 |
| Maximum reflectance | 0.54 | 0.45 | 0.39 | 0.55 | 2.26 |
| Difference value | 0.16 | 0.10 | 0.07 | 0.06 | 0.26 |

Embodiment 3

An antireflection film according to embodiment 3 has ten layers illustrated in FIG. 1 on a glass substrate having a refractive index of 1.80 and a film structure and a film thickness illustrated in Table 8. Numerical values in Table 8 indicate a physical film thickness [nm]. In the embodiment 3, similar to the embodiment 1, after nine layers of the undercoat layer are formed, the tenth layer is formed by coating hollow SiO$_2$ mixture preparation that is prepared to have a refractive index of 1.20, 1.23, 1.28, and 1.30, with a spin coater, and by sintering it for one hour.

TABLE 8

|  |  | Film reflectance | Embodiment 3-1 | Film reflectance | Embodiment 3-2 |
|---|---|---|---|---|---|
| Thin film layer | 10 | 1.20 | 112.30 | 1.23 | 124.60 |
|  | 9 | 1.45 | 92.70 | 1.45 | 10.00 |
|  | 8 | 2.09 | 15.40 | 2.09 | 14.30 |
|  | 7 | 1.61 | 34.90 | 1.61 | 49.60 |
|  | 6 | 2.09 | 31.90 | 2.09 | 68.90 |
|  | 5 | 1.61 | 23.20 | 1.61 | 11.10 |
|  | 4 | 2.09 | 41.30 | 2.09 | 52.10 |
|  | 3 | 1.61 | 30.40 | 1.61 | 32.80 |
|  | 2 | 2.09 | 24.10 | 2.09 | 24.30 |
|  | 1 | 1.61 | 15.00 | 1.61 | 20.00 |
| Substrate reflectance |  | 1.80 |  | 1.80 |  |

|  |  | Film reflectance | Embodiment 3-3 | Film reflectance | Embodiment 3-4 |
|---|---|---|---|---|---|
| Thin film layer | 10 | 1.28 | 111.50 | 1.30 | 121.20 |
|  | 9 | 1.45 | 63.40 | 1.45 | 10.00 |
|  | 8 | 2.09 | 10.00 | 2.09 | 17.20 |
|  | 7 | 1.61 | 49.10 | 1.61 | 43.90 |
|  | 6 | 2.09 | 45.10 | 2.09 | 73.20 |
|  | 5 | 1.61 | 23.80 | 1.61 | 12.50 |
|  | 4 | 2.09 | 45.80 | 2.09 | 48.40 |
|  | 3 | 1.61 | 34.90 | 1.61 | 34.90 |
|  | 2 | 2.09 | 23.80 | 2.09 | 23.70 |
|  | 1 | 1.61 | 17.90 | 1.61 | 20.90 |
| Substrate reflectance |  | 1.80 |  | 1.80 |  |

In Table 8, the refractive index of the substrate to the d-line is 1.80. The thickness of the uppermost, tenth layer ranges from 110.0 nm to 135.00 nm (more specifically from 111.50 nm to 124.60 nm).

A plurality of thin film layers except the thin film layer 10 includes at least one pair (four pairs herein) of an intermediate refractive index layer having a refractive index of 1.61 and a high refractive index layer having a refractive index of 2.09 in order from the substrate 11 to the thin film layer 10. The thin film layer 9 serves as a low refractive index layer having a refractive index of 1.45 and is provided between the thin film layer 10 and the thin film layer 8 that is a high refractive index layer closest to the thin film layer 10. In the embodiment 3, the thin film layer 10 is thickest in the plurality of thin film layers.

Figure 8A:
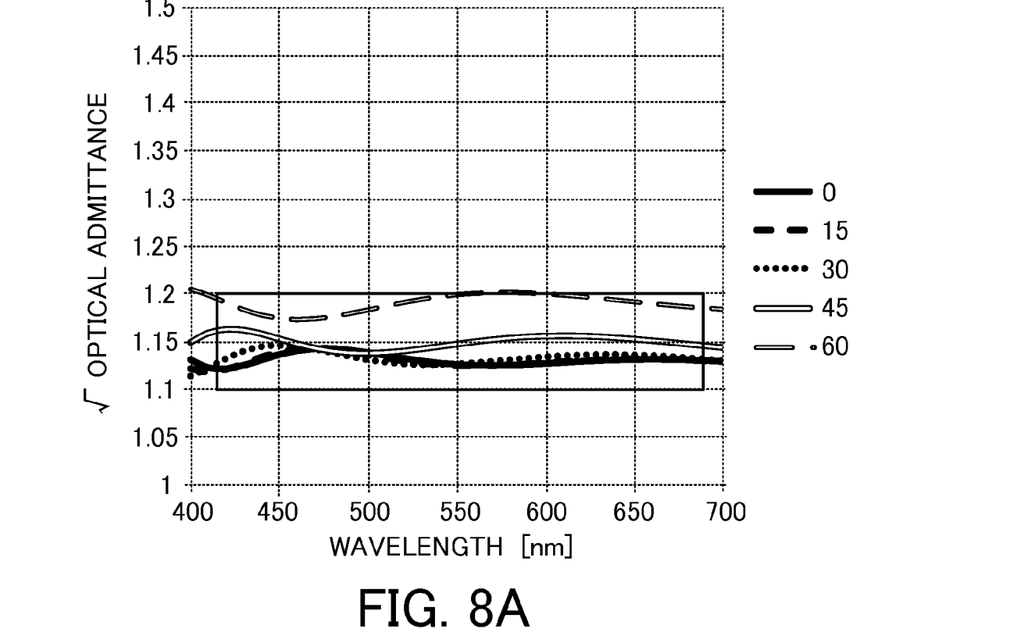
FIGS. 8A and 8B are views of a spectral optical admittance and reflectance according to embodiment 3 of the present invention.

FIG. 8A is a graph of an optical admittance √Y of the undercoat layer at the incident angles 0°, 15°, 30°, 45°, and 60° with a wavelength in a range from 400 nm to 700 nm according to the embodiment 3-1 in which the tenth layer has a refractive index of 1.20 as one representative example in Table 8.

Figure 9A:
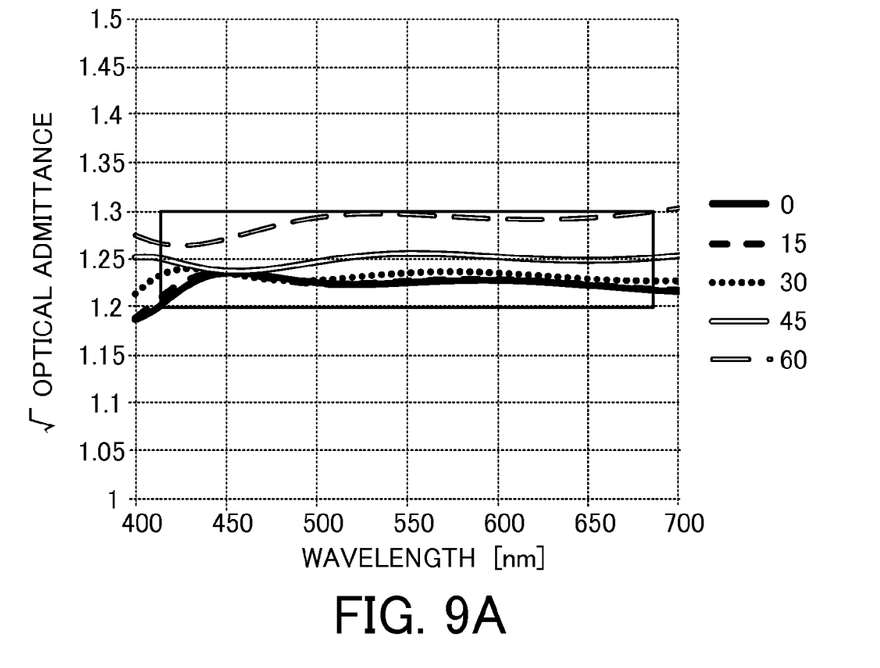
FIGS. 9A and 9B are views of a spectral optical admittance and reflectance according to the embodiment 3 of the present invention.

FIG. 9A is a graph of an optical admittance √Y of the undercoat layer at the incident angles 0°, 15°, 30°, 45°, and 60° with a wavelength from 400 nm to 700 nm according to the embodiment 3-4 in which the tenth layer has a refractive index of 1.30 as one representative example in Table 8.

It is understood that the square root of the optical admittance in the embodiment 3-1 falls in a range (or a frame in FIG. 8A) from 1.10 to 1.20 with all incident angles in a wavelength range from 420 nm to 680 nm, and the square root of the optical admittance in the embodiment 3-4 falls in a range (or a frame in FIG. 9A) from 1.20 to 1.30 with all incident angles in a wavelength range from 420 nm to 680 nm. It is therefore understood that the conditional expression (1) is satisfied.

Figure 8B:
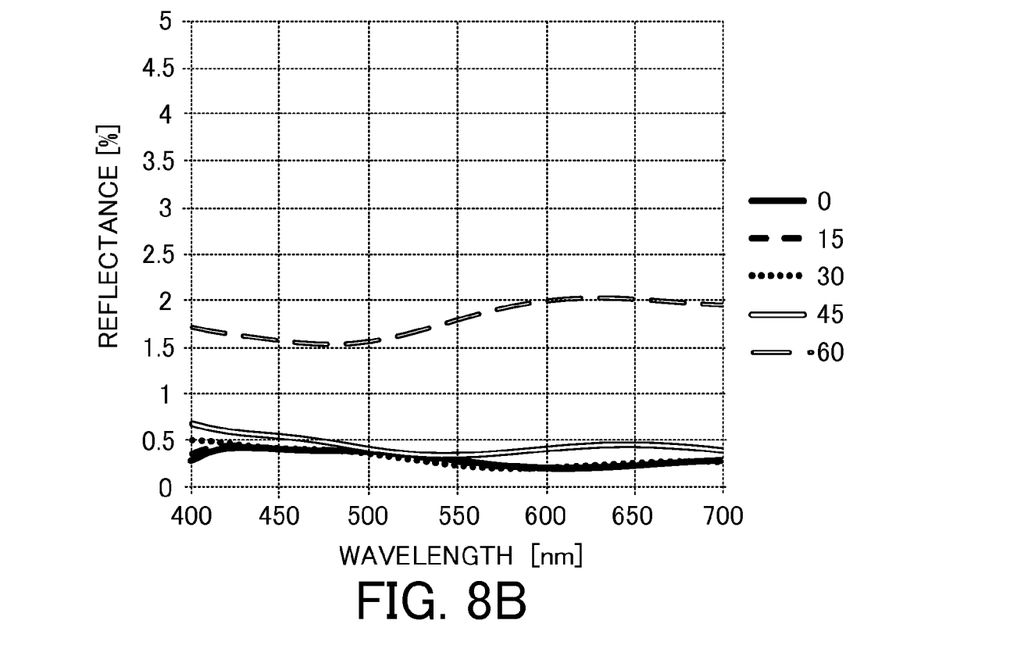
Figure 9B:
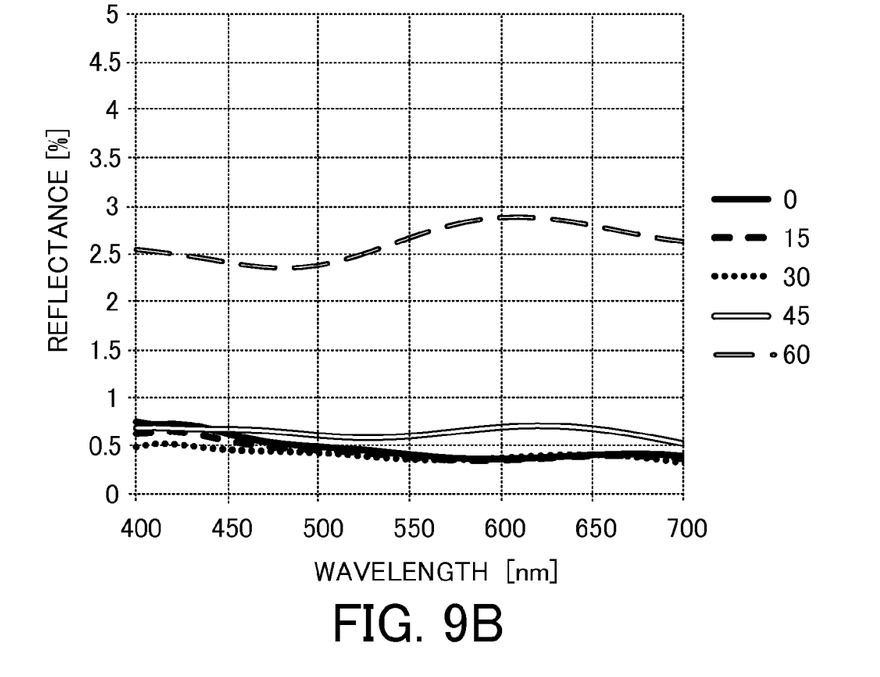

FIGS. 8B and 9B are graphs of a spectral reflectance at each incident angle with a wavelength range from 400 nm to 700 nm according to the embodiments 3-1 and 3-4. The spectral reflectance is less than about 0.5% up to the incident angle of 45°, and less than 2% at the incident angle of 60°. It is understood that there is little heave on a long wavelength side and a low reflection is maintained over a visible wavelength band.

Table 9 summarizes an average value, a maximum value, a minimum value, of the optical admittance and the average reflectance and the maximum reflectance and a difference value between them at each incident angle with a wavelength in a range from 420 nm to 680 nm according to the embodiment 3-1 to 3-4. It is understood from this table that the optical admittance falls within the range of the conditional expression 1 (from 1.15 to 1.25), and the variation of the reflectance is maintained 0.4% or less.

In summary, the antireflection film according to this embodiment is a high-performance low-reflection antireflection film having a flat wavelength characteristic over a wide incident angle range.

Table 10 summarizes a film structure of comparative example 2. A result of a similar research in which the tenth layer has a refractive index of 1.325 is illustrated.

Figure 10A:
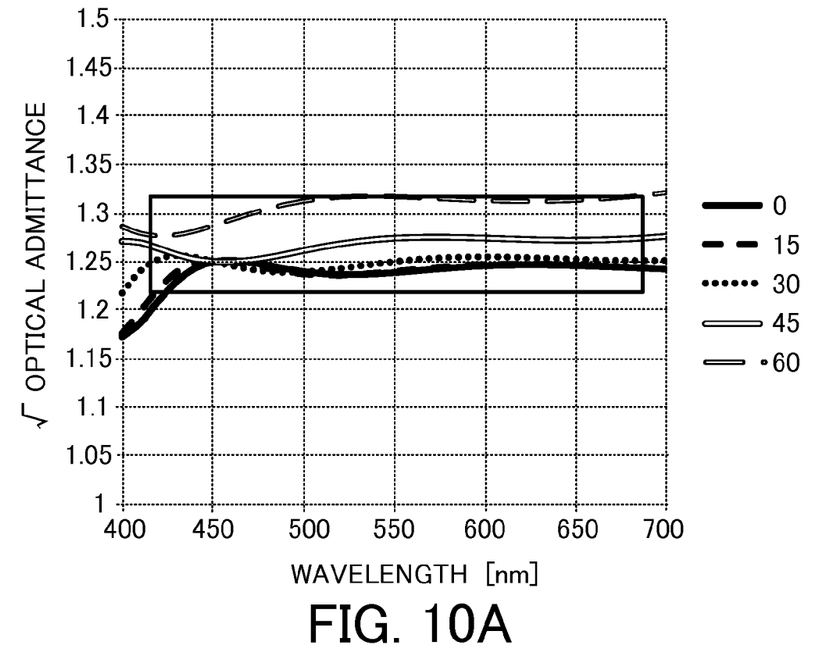
FIGS. 10A and 10B are views of a spectral optical admittance and reflectance according to a comparative example 2.

FIG. 10A is a graph of an optical admittance √Y of the undercoat layer at the incident angles 0°, 15°, 30°, 45°, and 60° with a wavelength in a range from 400 nm to 700 nm according to the comparative example 2.

Figure 10B:
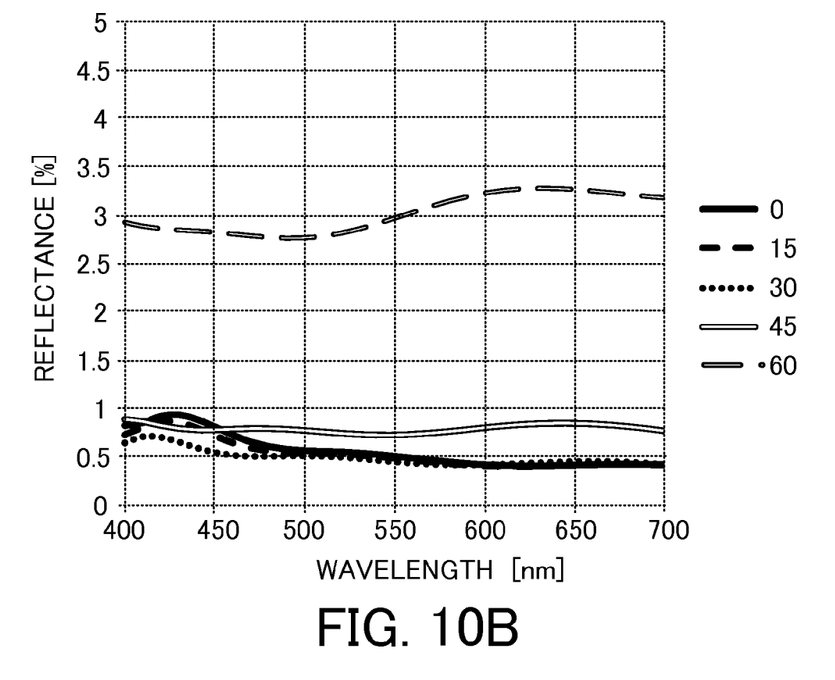

FIG. 10B is a graph of a spectral reflectance at each incident angle with a wavelength in a range from 400 nm to 700 nm according to the comparative example 2.

Table 11 summarizes an average value, a maximum value, a minimum value, of the optical admittance and the average reflectance and the maximum reflectance and a difference value between them at each incident angle with a wavelength in a range from 420 nm to 680 nm according to the comparative example 2. While the comparative example 2 has a flat characteristic up to the incident angle of 60°, the average reflectance exceeds 3%. The optical admittance is located outside the range (or frame in FIG. 10A) of the conditional expression (1) near 430 nm and at the incidence angle of 0°, and consequently the reflectance becomes as high as about 1% near 430 nm at the incidence angle of 0°.

In conclusion, when the reflectance of the uppermost layer exceeds 1.30, it is difficult to realize both the low reflection at the high incident angle and the flat wavelength characteristic. On the other hand, the tenth layer having a reflectance of less than 1.20, although not illustrated, may secure the designed characteristic but weakens a film strength due to the insufficient binder.

Thus, the uppermost, tenth layer needs to have a refractive index of 1.20 to 1.30.

TABLE 9

|  | 0 deg | 15 deg | 30 deg | 45 deg | 60 deg |
|---|---|---|---|---|---|
| Embodiment 3-1_Y | | | | | |
| Ave | 1.13 | 1.13 | 1.13 | 1.15 | 1.19 |
| Max | 1.14 | 1.14 | 1.15 | 1.16 | 1.20 |
| min | 1.12 | 1.12 | 1.13 | 1.14 | 1.17 |
| Embodiment 3-2_Y | | | | | |
| Ave | 1.17 | 1.16 | 1.16 | 1.18 | 1.21 |
| Max | 1.19 | 1.19 | 1.19 | 1.20 | 1.22 |
| min | 1.14 | 1.14 | 1.14 | 1.16 | 1.20 |
| Embodiment 3-3_Y | | | | | |
| Ave | 1.21 | 1.21 | 1.21 | 1.23 | 1.27 |
| Max | 1.22 | 1.22 | 1.22 | 1.24 | 1.28 |
| min | 1.19 | 1.20 | 1.21 | 1.22 | 1.24 |
| Embodiment 3-4_Y | | | | | |
| Ave | 1.22 | 1.23 | 1.23 | 1.25 | 1.29 |
| Max | 1.24 | 1.24 | 1.24 | 1.26 | 1.30 |
| min | 1.21 | 1.22 | 1.23 | 1.24 | 1.26 |
| Embodiment 3-1_R | | | | | |
| Average reflectance | 0.31 | 0.31 | 0.32 | 0.45 | 1.79 |
| Maximum reflectance | 0.43 | 0.44 | 0.47 | 0.60 | 2.04 |
| Difference value | 0.12 | 0.13 | 0.16 | 0.15 | 0.24 |
| Embodiment 3-2_R | | | | | |
| Average reflectance | 0.35 | 0.33 | 0.32 | 0.49 | 1.99 |
| Maximum reflectance | 0.48 | 0.43 | 0.36 | 0.54 | 2.21 |
| Difference value | 0.12 | 0.10 | 0.04 | 0.05 | 0.22 |
| Embodiment 3-3_R | | | | | |
| Average reflectance | 0.45 | 0.42 | 0.38 | 0.58 | 2.34 |
| Maximum reflectance | 0.67 | 0.60 | 0.46 | 0.62 | 2.58 |
| Difference value | 0.22 | 0.18 | 0.08 | 0.04 | 0.24 |
| Embodiment 3-4_R | | | | | |
| Average reflectance | 0.49 | 0.45 | 0.41 | 0.65 | 2.61 |
| Maximum reflectance | 0.72 | 0.65 | 0.51 | 0.71 | 2.88 |
| Difference value | 0.24 | 0.20 | 0.10 | 0.06 | 0.27 |

TABLE 10

|  |  | Film reflectance | Comparative example_thickness |
|---|---|---|---|
| Thin film layer | 10 | 1.325 | 119.60 |
|  | 9 | 1.45 | 10.00 |
|  | 8 | 2.09 | 12.40 |
|  | 7 | 1.61 | 51.10 |
|  | 6 | 2.09 | 152.60 |
|  | 5 | 1.61 | 30.00 |
|  | 4 | 2.09 | 29.70 |
|  | 3 | 1.61 | 56.80 |
|  | 2 | 2.09 | 18.80 |
|  | 1 | 1.61 | 33.20 |

TABLE 10-continued

|  | Film reflectance | Comparative example_thickness |
|---|---|---|
| Substrate reflectance |  | 1.80 |

TABLE 11

|  | 0 deg | 15 deg | 30 deg | 45 deg | 60 deg |
|---|---|---|---|---|---|
| Comparative example 2_Y |  |  |  |  |  |
| Ave | 1.24 | 1.24 | 1.25 | 1.27 | 1.30 |
| Max | 1.25 | 1.25 | 1.26 | 1.27 | 1.32 |
| min | 1.21 | 1.22 | 1.24 | 1.25 | 1.28 |
| Comparative example 2_R |  |  |  |  |  |
| Average reflectance | 0.59 | 0.55 | 0.51 | 0.81 | 3.02 |
| Maximum reflectance | 0.95 | 0.87 | 0.72 | 0.86 | 3.30 |
| Difference value | 0.37 | 0.32 | 0.20 | 0.05 | 0.27 |

Embodiment 4

Figure 11:
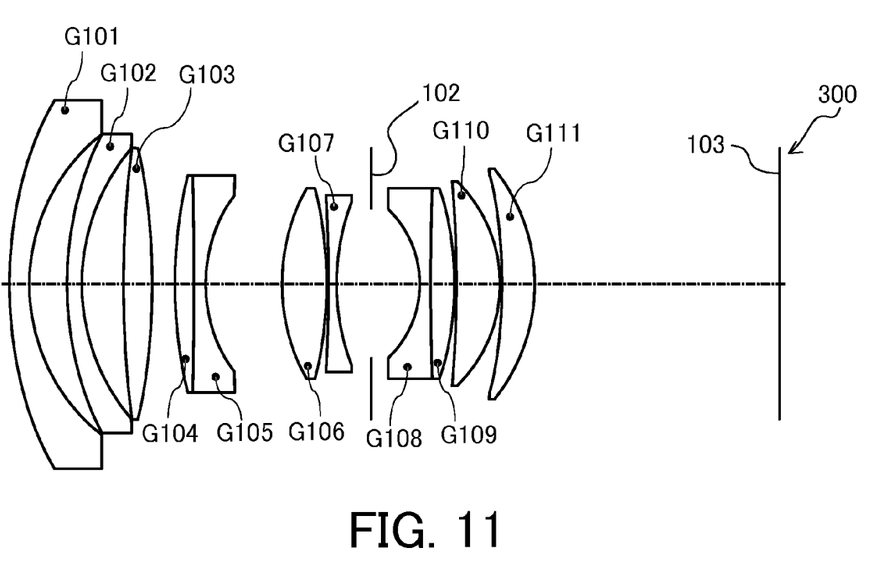
FIG. 11 is a schematic structural view of one illustrative optical element according to embodiment 4 of the present invention.

FIG. 11 illustrates an optical element to which an antireflection film according to this embodiment is applied and an image-pickup optical system (imaging optical system) 300 including the optical element. This image-pickup optical system 300 is used for an optical apparatus, such as a digital camera, a video camera, and an interchangeable lens. In FIG. 11, reference numeral 103 denotes an image-pickup plane, on which a solid-state image sensor (photoelectric conversion element), such as a CCD sensor and a CMOS sensor is placed. Reference numeral 102 denotes a diaphragm. Reference numerals G101 to G111 denote lenses as optical elements. The antireflection film according to the present invention is applied to at least one surface of these lenses.

Each of the above embodiments can provide an optical element, optical system, and optical apparatus, each of which includes an antireflection film that can maintain a high antireflection performance in a wide input angle range.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-234892, filed Nov. 13, 2013, which is hereby incorporated by reference herein in its entirety.

What is claimed is:

1. An optical element comprising a substrate that is transparent to a d-line, and an antireflection film formed on the substrate,
   wherein the antireflection film includes a plurality of thin film layers that include an uppermost layer that is most distant from the substrate and has a refractive index nd of 1.20 to 1.30 to the d-line, a high refractive index layer having a refractive index of 2.00 to 2.40 to the d-line, and at least one of an intermediate refractive index layer having a refractive index of 1.55 to 1.70 to the d-line and a low refractive index layer having a refractive index of 1.40 to 1.52 to the d-line, and
   wherein an undercoat layer includes the substrate to the thin film layer adjacent to the uppermost layer, and the following expression is satisfied, where $Y(\theta, \lambda)$ is an optical admittance calculated from a refractive index to the d-line and a film thickness of the undercoat layer, $\theta$ is an incident angle in a range of 0° to 60°, and $\lambda$ is a wavelength in a range of 420 nm and 680 nm:

$$nd - 0.1 \leq \sqrt{Y(\theta,\lambda)} \leq nd.$$

2. The optical element according to claim 1, wherein the antireflection film includes at least nine thin film layers.

3. The optical element according to claim 1, wherein the uppermost layer is a layer that includes hollow nanoparticles each made of silica as a primary ingredient, and having an average particle diameter of 80 nm or smaller.

4. The optical element according to claim 1, wherein the high refractive index layer is made of one of titanium, tantalum, zirconium, chrome, niobium, cerium, hafnium, and yttrium singularly or a mixture of one or more of titanium, tantalum, zirconium, chrome, niobium, cerium, hafnium, and yttrium.

5. The optical element according to claim 1, wherein the intermediate refractive index layer is made of aluminum oxide solely or a mixture of aluminum oxide.

6. The optical element according to claim 1, wherein the uppermost layer is made of silicon oxide solely or a mixture of silicon oxide.

7. The optical element according to claim 1, wherein a layer among the plurality of thin film layers closest to the substrate is made of $Al_2O_3$ solely or a mixture of $Al_2O_3$.

8. The optical element according to claim 1, wherein the uppermost layer is formed by a sol-gel method, and the plurality of thin film layers except the uppermost layer is formed by a vacuum evaporation method or a sputtering method.

9. The optical element according to claim 1, wherein the substrate has a refractive index of 1.50 to 2.00 to the d-line.

10. The optical element according to claim 1, wherein the uppermost layer has a thickness of 110.00 nm to 135.00 nm.

11. The optical element according to claim 1, wherein the plurality of thin film layers except the uppermost layer includes, in order from the substrate to the uppermost layer, at least one pair of the intermediate refractive index layer and the high refractive index layer, and the high refractive index layer closest to the uppermost layer contacts the uppermost layer.

12. The optical element according to claim 1, wherein the plurality of thin film layers except the uppermost layer includes, in order from the substrate to the uppermost layer, at least one pair of the intermediate refractive index layer and the high refractive index layer, and the low refractive index layer that has the refractive index of 1.40 to 1.52 to the d-line is provided between the high refractive index layer closest to the uppermost layer and the uppermost layer.

13. The optical element according to claim 12, wherein the low refractive index layer is made of silicon oxide solely or a mixture of silicon oxide.

14. The optical element according to claim 12, wherein there are a plurality of pairs, and one of the plurality of high refractive index layers is thicker than each of upper and lower intermediate refractive index layers.

15. The optical element according to claim 12, wherein one of the plurality of high refractive index layers is thicker than the uppermost layer.

16. The optical element according to claim 12, wherein the uppermost layer is thickest among the plurality of thin film layers.

17. An optical system comprising an optical element,
   wherein the optical element includes a substrate that is transparent to a d-line, and an antireflection film formed on the substrate, wherein the antireflection film includes a plurality of thin film layers that include an uppermost layer that is most distant from the substrate and has a refractive index nd of 1.20 to 1.30 to the d-line, a high refractive index layer having a refractive index of 2.00 to 2.40 to the d-line, and at least one of an intermediate refractive index layer having a refractive index of 1.55 to 1.70 to the d-line and a low refractive index layer having a refractive index of 1.40 to 1.52 to the d-line, and     wherein an undercoat layer includes the substrate to the thin film layer adjacent to the uppermost layer, and the following expression is satisfied, where $Y(\theta, \lambda)$ is an optical admittance calculated from a refractive index to the d-line and a film thickness of the undercoat layer, $\theta$ is an incident angle in a range of 0° to 60°, and $\lambda$ is a wavelength in a range of 420 nm and 680 nm:

$$nd - 0.1 \leq \sqrt{Y(\theta, \lambda)} \leq nd.$$

18. An optical apparatus comprising an optical element, wherein the optical element includes a substrate that is transparent to a d-line, and an antireflection film formed on the substrate, wherein the antireflection film includes a plurality of thin film layers that include an uppermost layer that is most distant from the substrate and has a refractive index nd of 1.20 to 1.30 to the d-line, a high refractive index layer having a refractive index of 2.00 to 2.40 to the d-line, and at least one of an intermediate refractive index layer having a refractive index of 1.55 to 1.70 to the d-line and a low refractive index layer having a refractive index of 1.40 to 1.52 to the d-line, and     wherein an undercoat layer includes the substrate to the thin film layer adjacent to the uppermost layer, and the following expression is satisfied, where $Y(\theta, \lambda)$ is an optical admittance calculated from a refractive index to the d-line and a film thickness of the undercoat layer, $\theta$ is an incident angle in a range of 0° to 60°, and $\lambda$ is a wavelength in a range of 420 nm and 680 nm:

$$nd - 0.1 \leq \sqrt{Y(\theta, \lambda)} \leq nd.$$

* * * * *